US012205309B2

(12) United States Patent
Blonder et al.

(10) Patent No.: US 12,205,309 B2
(45) Date of Patent: Jan. 21, 2025

(54) SYSTEM AND METHOD FOR DETECTING CHANGES IN AN ASSET BY IMAGE PROCESSING

(71) Applicant: Percepto Robotics Ltd, Modiln (IL)

(72) Inventors: Sagi Blonder, Ness Ziona (IL); Ovadya Menadeva, Modiln (IL); Yura Zharkovsky, Yavne (IL); Ariel Benitah, Ein Zurim (IL)

(73) Assignee: Percepto Robotics Ltd, Modiln (IL)

( * ) Notice: Subject to any disclaimer, the term of this patent is extended or adjusted under 35 U.S.C. 154(b) by 196 days.

(21) Appl. No.: 17/372,468

(22) Filed: Jul. 11, 2021

(65) Prior Publication Data

US 2023/0009954 A1    Jan. 12, 2023

(51) Int. Cl.
*G06K 9/00*     (2022.01)
*G06T 5/50*     (2006.01)
(Continued)

(52) U.S. Cl.
CPC ............. *G06T 7/337* (2017.01); *G06T 5/50* (2013.01); *G06V 10/255* (2022.01); *G06T 2207/20081* (2013.01); *G06T 2207/20084* (2013.01)

(58) Field of Classification Search
CPC ........................................... G06T 2207/10032
See application file for complete search history.

(56) References Cited

U.S. PATENT DOCUMENTS 11,151,702 B1 * 10/2021 Tico .................. G06T 5/60
2016/0148383 A1 * 5/2016 Cerqueira ............... G01W 1/14
382/194

(Continued)

FOREIGN PATENT DOCUMENTS

AU      2017232220 A1 *  4/2019
WO   WO-2022251905 A1 *  5/2021

OTHER PUBLICATIONS

Hakim, Patria Rachman, et al. "Satellite Attitude Determination Based on Pushbroom Image Band Coregistration." 2018 IEEE International Conference on Aerospace Electronics and Remote Sensing Technology (ICARES). IEEE, 2018.*

(Continued)

*Primary Examiner* — Gregory A Morse
*Assistant Examiner* — Owais Iqbal Memon

(57) ABSTRACT

The subject matter discloses a method of asset change detection using images, the method comprising steps executed by processing circuitry, the steps comprising: receiving at least one image of an asset captured by an image capturing device; receiving at least one attribute of a task of detecting a change in the asset using the received at least one image, at least one of the at least one attribute being one of the group consisting of: an attribute measured by a sensor, an attribute extracted from a website, an attribute retrieved from a database, an attribute input by a user, and an attribute encoded in computer code; selecting a reference image among a plurality of reference images of the asset according to at least one criterion based on the received at least one attribute of the task of detecting the change in the asset; computing an asset-difference pixel map, using the selected reference image and the image captured by the image capturing device; and detecting the change in the asset, using the computed asset-difference map.

17 Claims, 9 Drawing Sheets

(51) Int. Cl.
*G06T 7/33* (2017.01)
*G06V 10/20* (2022.01)

(56) References Cited

U.S. PATENT DOCUMENTS

| | | | |
|---|---|---|---|
| 2016/0295208 A1* | 10/2016 | Beall | G06V 20/52 |
| 2016/0321513 A1* | 11/2016 | Mitti | G06V 20/63 |
| 2018/0218214 A1* | 8/2018 | Pestun | G06V 20/176 |
| 2019/0164009 A1* | 5/2019 | Gubbi Lakshminarasimha | G06T 7/254 |
| 2020/0326187 A1* | 10/2020 | Ohhashi | B64U 20/87 |
| 2021/0042499 A1* | 2/2021 | Hammad | G06F 18/214 |
| 2021/0217155 A1* | 7/2021 | Bolisetti | G06T 7/001 |
| 2021/0256712 A1* | 8/2021 | Safavi | G06T 7/292 |
| 2022/0358764 A1* | 11/2022 | Qian | G06V 20/176 |
| 2022/0414300 A1* | 12/2022 | Odisio | G06N 3/0464 |

OTHER PUBLICATIONS

Hakim, Patria Rachman, et al. "Satellite Attitude Determination Based on Pushbroom Image Band Coregistration." 2018 IEEE International Conference on Aerospace Electronics and Remote Sensing Technology (ICARES). IEEE, 2018. (Year: 2018).*

* cited by examiner

SYSTEM AND METHOD FOR DETECTING CHANGES IN AN ASSET BY IMAGE PROCESSING

FIELD AND BACKGROUND OF THE INVENTION

The present invention, in some embodiments thereof, relates to image processing and, more particularly, but not exclusively, to image processing for detecting changes in assets that are captured by the images.

Detecting changes in images is essential task in many image-processing systems. Such systems may be, for example, surveillance systems, medical devices and systems for monitoring health of equipment.

SUMMARY OF THE INVENTION

It is an object of the present invention to detect material and/or physical changes in infrastructure using visual data while ignoring non-semantic changes.

According to an aspect of some embodiments of the present invention there is provided a method of asset change detection using images, the method comprising steps executed by processing circuitry, the steps comprising: receiving at least one image of an asset captured by an image capturing device; receiving at least one attribute of a task of detecting a change in the asset using the received at least one image, at least one of the at least one attribute being one of the group consisting of: an attribute measured by a sensor, an attribute extracted from a website, an attribute retrieved from a database, an attribute input by a user, and an attribute encoded in computer code; selecting a reference image among a plurality of reference images of the asset according to at least one criterion based on the received at least one attribute of the task of detecting the change in the asset; computing an asset-difference pixel map, using the selected reference image and the image captured by the image capturing device; and detecting the change in the asset, using the computed asset-difference map.

According to some embodiments of the invention, the method further comprising classifying the change in the asset detected using the computed asset-difference pixel map.

According to some embodiments of the invention, the method further comprising communicating the detected change in the asset to a user.

According to some embodiments of the invention, the method further comprising aligning the captured image with respect to the selected reference image.

The image alignment may compensate for a difference in the capturing device location and/or attitude between the images.

According to some embodiments of the invention, the method further comprising computing a three-dimensional (3D) model of the asset, using at least one of the reference images, wherein the selecting of the reference image further comprises determining a viewpoint of the captured image using the 3D model and the at least one criterion is further based on the determined viewpoint.

According to some embodiments of the invention, the method further comprising using an Artificial Neural Network (ANN) trained for the computing of the asset-difference pixel map.

According to some embodiments of the invention, the method further comprising a preliminary step of training an Artificial Neural Network (ANN) for the computing of the asset-difference pixel map, using a plurality of image sets, each image set comprising a pair of images and a pair-difference pixel map representing a difference between the images of the pair.

According to some embodiments of the invention, the method further comprising a preliminary step of training an Artificial Neural Network (ANN) for the computing of the asset-difference pixel map, using a plurality of image sets, each image set comprising a pair of images and a pair-difference pixel map representing a difference between the images of the pair, the method further comprising allowing a user to set pixel values for the pair-difference pixel map, for indicating a semantic difference between the images of the pair.

According to some embodiments of the invention, at least one of the at least one attribute indicates a type of the task of detecting the change in the asset.

According to some embodiments of the invention, at least one of the at least one attribute indicates a light condition of the captured image used for the task.

According to some embodiments of the invention, at least one of the at least one attribute indicates a weather condition of the captured image used for the task.

According to some embodiments of the invention, at least one of the at least one attribute indicates a visibility condition of the captured image used for the task.

According to some embodiments of the invention, at least one of the at least one attribute indicates a visibility condition of the captured image used for the task.

According to some embodiments of the invention, at least one of the at least one attribute indicates ambient temperature of the captured image used for the task.

According to some embodiments of the invention, at least one of the at least one attribute indicates time of the captured image used for the task.

According to some embodiments of the invention, at least one of the at least one attribute indicates a capturing altitude of the captured image used for the task.

According to some embodiments of the invention, at least one of the at least one attribute indicates a capturing attitude of the captured image used for the task.

According to some embodiments of the invention, at least one of the at least one attribute indicates a quality of the image capturing device.

According to some embodiments of the invention, at least one of the at least one attribute indicates a resolution of the captured image.

According to some embodiments of the invention, at least one of the at least one attribute indicates a field of view of the captured image.

According to some embodiments of the invention, at least one of the at least one attribute indicates a characteristic of the asset.

According to an aspect of some embodiments of the present invention there is provided a system for asset change detection using a drone, the system comprising: processing circuitry and a memory in communication with the processing circuitry. he memory containing instructions that, when executed by the processing circuitry, cause the system to: receive at least one image of an asset captured by an image capturing device; receive at least one attribute of a task of detecting a change in the asset using the received at least one image, at least one of the at least one attribute being one of the group consisting of: an attribute measured by a sensor, an attribute extracted from a website, an attribute retrieved from a database, an attribute input by a user, and an attribute encoded in computer code select a reference image among a plurality of reference images of the asset according to at least one criterion based on the received at least one attribute of the task of detecting the change in the asset; compute an asset-difference pixel map, using the selected reference image and the image captured by the image capturing device; and detect the change in the asset, using the computed asset-difference map.

According to an aspect of some embodiments of the present invention there is provided a non-transitory computer readable medium having stored thereon instructions for causing a processing circuitry to perform a process of asset change detection using a drone, the process comprising: receiving at least one image of an asset captured by an image capturing device; receiving at least one attribute of a task of detecting a change in the asset using the received at least one image, at least one of the at least one attribute being one of the group consisting of: an attribute measured by a sensor, an attribute extracted from a website, an attribute retrieved from a database, an attribute input by a user, and an attribute encoded in computer code; selecting a reference image among a plurality of reference images of the asset according to at least one criterion based on the received at least one attribute of the task of detecting the change in the asset; computing an asset-difference pixel map, using the selected reference image and the image captured by the image capturing device and detecting the change in the asset, using the computed asset-difference map.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions, Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
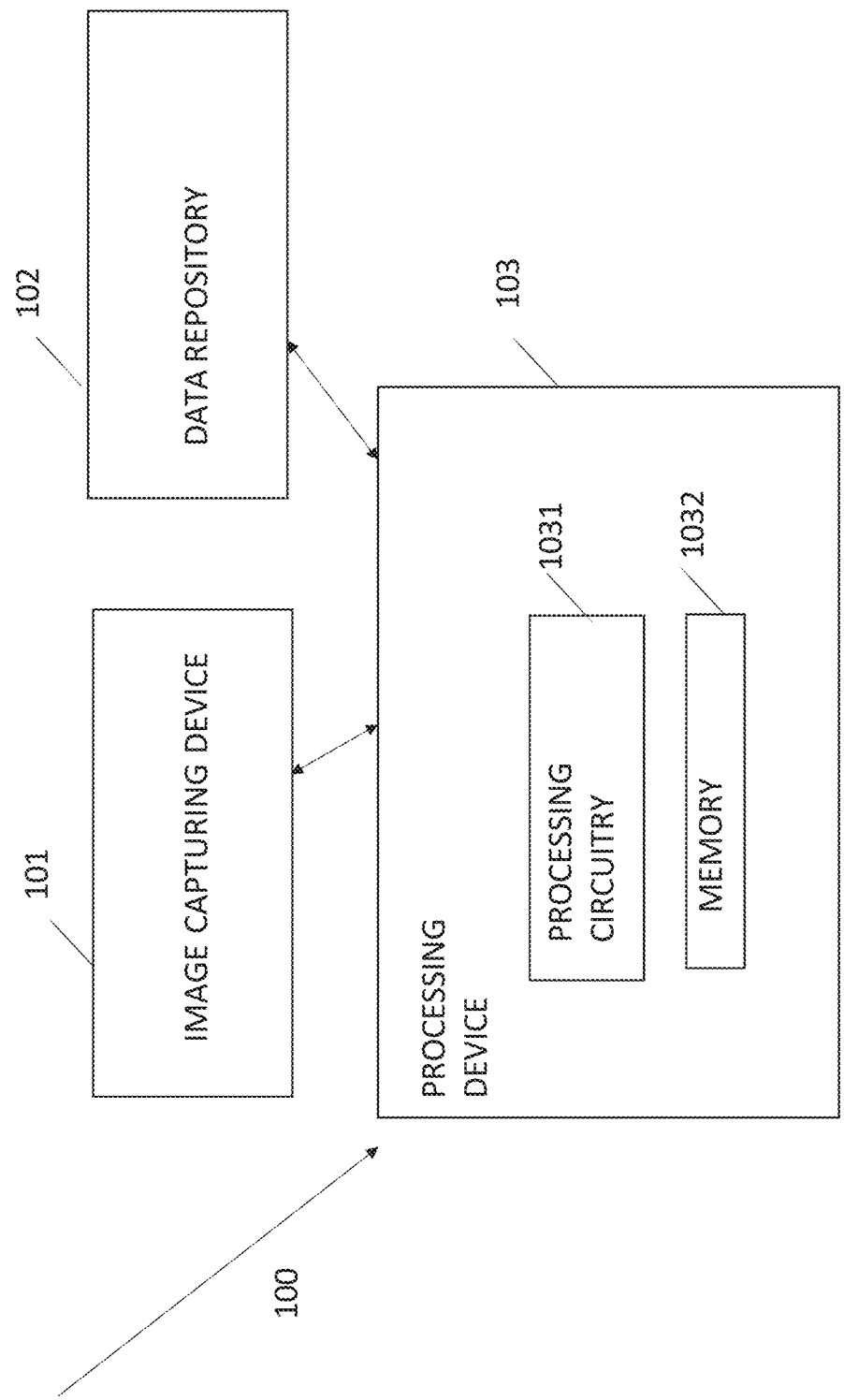
FIG. 1 is a block diagram of a system for detecting change in assets, according to some embodiment of the present invention.

The present invention, in some embodiments thereof, relates to image processing and, more particularly, but not exclusively, to image processing for detecting changes in images.

One technical problem of the present invention how to detect material and/or physical changes in assets from captured images. In some cases, the assets belong to sites that are continuously inspected by a drone. Examples of such sites are solar farms, oil gas sites, thermal power plants, ports etc.

Since capturing of images by a drone may be performed at various environmental conditions, from various positions and at different hours and seasons, there is a problem to differentiate the changes in the assets from the changes that are related to the environment or to the location of the capture.

One technical solution is providing a data repository of reference images of the asset. The reference images are captured in various hours and seasons and from various positions. In such a solution, the system compares the captured image with the most related reference image of the data repository in order to find changes in the asset. The most related reference image is captured in similar environment as the image of the inspected asset.

In some embodiments, the system utilizes artificial intelligence network for better detecting the change in the asset. Such an artificial network is trained to ignore non-semantic changes between the compared images.

Such a solution improves the process of detecting changes of the asset since the differences between the images are mainly related to physical changes of the asset and not to differences between images that are caused by environmental conditions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The term asset refers herein to physical object that is inspected for detecting changes.

The term semantic change refers herein to a change in the asset that does not include environmental changes. Examples of environmental changes are shadows, light conditions, seasonal changes and the like.

The terms ground truth (GT) and asset-difference pixel map are used herein interchangeably.

Referring now to the drawings, FIG. 1 illustrates a block diagram of a system for detecting changes in images, according to some embodiment of the present invention. System 100 for detecting changes in images includes an image-capturing device 101, a data repository 102 and a processing device 103.

In some embodiments, the system is used for detecting changes in assets from images that are captured by drones.

The image-capturing device 101 is adapted for capturing images of the assets. The image capturing device 101 may be a camera, an infrared (IR) a thermal camera, a thermographic camera, ultraviolet (UV)) cameras, depth cameras and the like. The image-capturing device 101 is configured for capturing images from different locations, at different resolutions or Field of View (FOV), at different environment conditions (time of day, weather, ambient conditions, and the like). The image-capturing device 101 may be installed, for example, in a drone that inspects assets (the drone is not shown in the figure).

The data repository 102 is configured for storing the references image. The stored images include metadata that describes the attributes of the image, enabling to query the database without analyzing each image. The metadata includes raw image meta-data, environmental metadata and semantic metadata.

The Raw image meta data includes at least time of capture, type of capturing device (device model), channels and type of image (visual, IR, UV, thermal, depth, etc.), image resolution, location of capture device during capture, attitude of capture device during capture, image field of view or zoom, exposure, gain, and white balance of capture device during capture.

The Environment meta-data includes Light conditions (from a light meter). The light condition may be described in LUX. The Environment meta-data may also include weather conditions (rain, wind from a weather station), visibility conditions and ambient temperature during capture.

According to some embodiments, the system identifies the semantic data in a reference image by identifying the assets and components associated with the assets. Such identification is according to location and angle metadata and according to matching of certain parts in the image with other captured data of known assets. Such a mapping enables efficient querying of the database for selecting the relevant reference image in the change detection process.

The data repository 102 may be located at a dedicated server (not shown in the figure) or at the same server as the processing device 103.

The processing device 103 is configured for selecting a reference image, for processing the differences between the captured image of an asset and the selected reference image of the asset and for detecting a change in the asset in accordance with the detected difference.

The processing device 103 includes a processing circuitry 1031 and memory 1032. The memory 1032 is in communication with the processing circuitry 1031. The memory 1032 contains instructions that, when executed by the processing circuitry 1031, cause the system to perform the method illustrated in FIG. 2.

The processing device 103 may be part of the same server as the data repository 102 or at a separate server. When the processing device 103 is in a separate server then the servers communicate via the internet. The image-capturing device 101 communicates with the servers via the internet.

Figure 2:
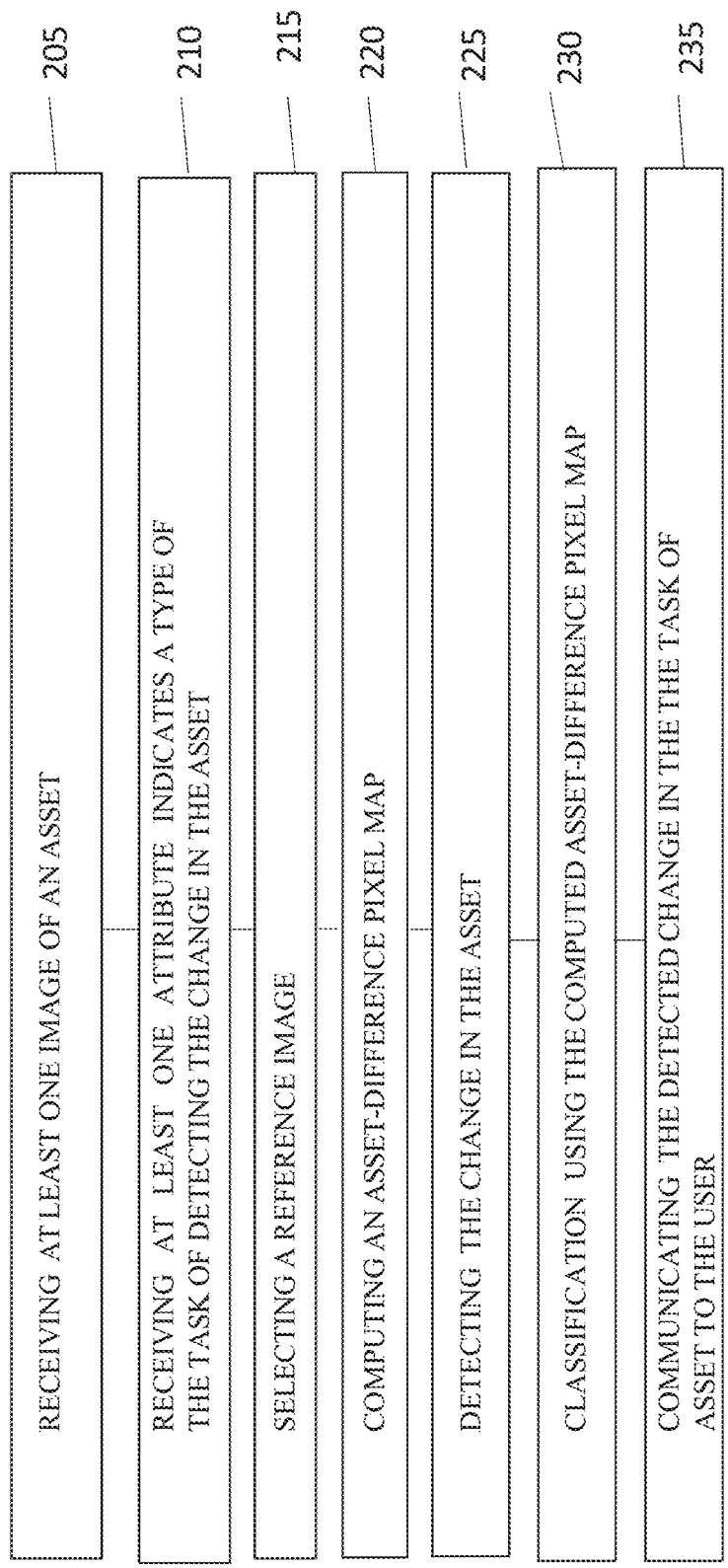
FIG. 2 is a flowchart diagram of a method for detecting changes in assets, according to some embodiment of the present invention.

FIG. 2 illustrates a flowchart diagram of the method for detecting changes in assets, according to some embodiment of the present invention. At block 205, the system receives at least one image of an asset captured by an image-capturing device.

At block 210, the system receives an attribute indicating a type of the task of detecting the change in the asset. An attribute may be, for example, an attribute measured by a sensor, an attribute extracted from a website, an attribute retrieved from a database, an attribute input by a user, and an attribute encoded in computer code and a combination thereof. The attribute is used for selecting the most related reference image.

The attribute may indicate light condition of the captured image. The attribute may indicate weather condition of the captured image. The attribute may indicate visibility condition of the captured image. The attribute may indicate ambient temperature of the captured image. The attribute may indicate time of the captured image. The attribute may indicate capturing altitude of the captured image. The attribute may indicate a quality of the image. The attribute may indicate a resolution of the captured image. The attribute may indicate a field of view of the captured image and a characteristic of the asset.

At block 215, the system selects a reference image among a plurality of reference images of the asset according to a criterion that is based on the received attribute of the task of detecting the change in the asset.

The selecting of the references image may be in accordance with the following criteria:

- The clarity of the asset in the image
- Location & attitude of the capturing device (as close to the captured image as possible)
- Time of capture
- Environment conditions on capture such as ambient temperature, light conditions which are selected to be close to the light condition of the input image.
- In one example of leakage detection, the system may select the most recent capture of a certain view (angle) of the asset taken in full day light for the change to be detectable, as well as another older reference image to detect the leakage trend.
- In a second example, for corrosion detection, the system may select a reference image with minimal resolution (pixel/cm of asset surface) captured at least two weeks before the inspection image showing enough degradation, In a third example, for power lines inspection, the system may select a thermal capture as reference taken from a close enough distance and at a low enough ambient temperature emphasizing a change in isolators heat dissipation.

At block 220, the system computes an asset-difference pixel map, using the selected reference image and the image captured by the image-capturing device. In some embodiments, the images are aligned before performing the computing. In one embodiment the system performs feature alignment using scale-invariant feature transform (SIFT) as key points and the HardNet Neural Network Architecture for descriptor learning. In another embodiment, a different technique such as Superpoint for feature extraction and SOSNet for descriptor learning may be used. The matched key points are used for calculating the homographic transformation using, for example, RANSAC algorithm.

In some embodiments, the system provide Graphical User Interface (GUI) for allowing a user to set pixel values for the asset-difference pixel map, for indicating a semantic difference between the images of the asset-difference pixel map Such Graphical User Interface (GUI enables to detect the change in the asset with additional manual assistance of the user. At block 225, the system detects the change in the asset, using the asset-difference pixel map.

At block 230, the detected change is classified using the computed asset-difference pixel map. Classification may be in accordance with severeness, importance etc. The classification is for allowing the user to analyze the changes in the asset.

Classification is performed by a neural network for example, trained according to the task in hand (e.g. classifying a change between an oil leak, a puddle or a corrosion, for example) or according to a user preference (e.g. according to feedback from users that oil leaks below a certain size are not interesting).

At block 235, the system communicates the detected change to a user. For allowing the user to analyze the changes in the asset. The changes are communicated to a computer device of the user and are presented to the user in a display of the computer device. It should be noted that in some embodiments the system computes a three-dimensional (3D) model of the asset, using at least one of the reference images. The selecting of the reference image further comprises determining a viewpoint of the captured image using the 3D model and the least one criterion is further based on the determined viewpoint.

Figure 3:
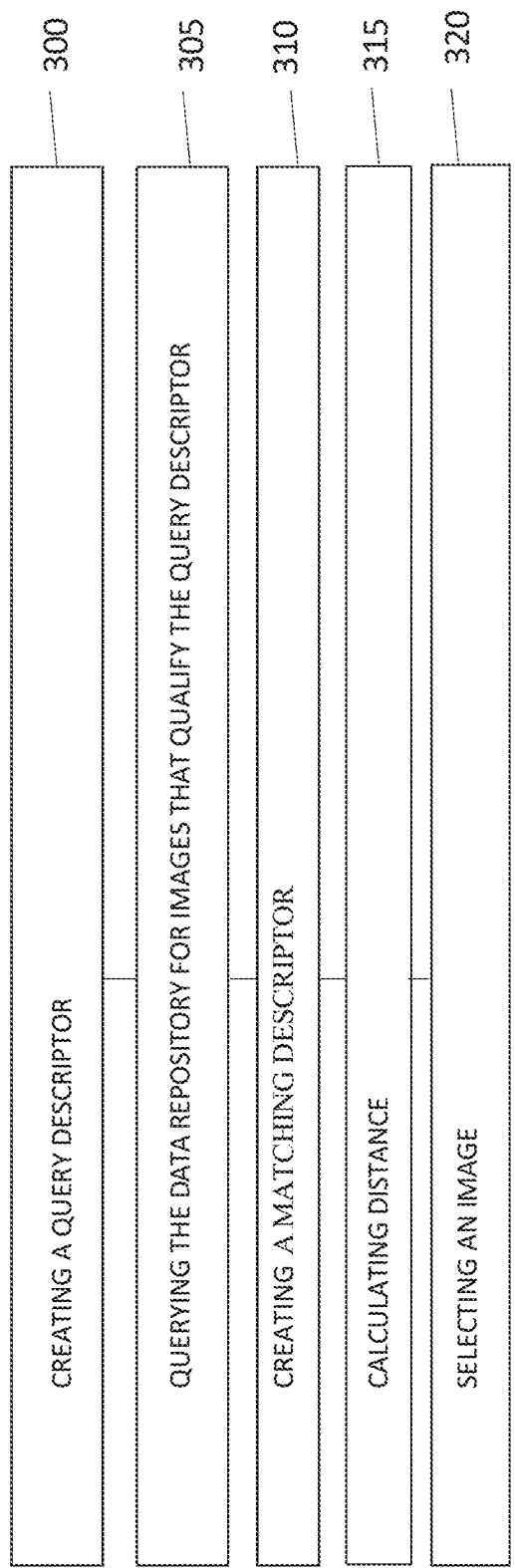
FIG. 3 is a flowchart diagram of a method of selecting a reference image, according to some embodiment of the present invention.

FIG. 3 is a flowchart diagram of a method of selecting a reference image according to some embodiment of the present invention.

According to some embodiments, the system selects an image that is captured in similar conditions as the input image as the reference image.

At block 300, a query descriptor is created. The descriptor includes image requirements. Such requirements may be subject of asset, image type, range of time, etc.

At block 305, the system queries the data repository for images that qualifies the query descriptor.

Blocks 310, 315 and 320 are performed if more than one image is qualified:

At block 310, the system creates a matching descriptor from the captured image and each of the qualifying images. The matching descriptor may include location and attitude of capturing device, ambient conditions and resolution. In some cases, the matching descriptor is weighted according to matching priority for example, it is more important to match camera attitude than light conditions.

At block 315, the system calculates distance between the captured image matching descriptor and each of the qualifying image's descriptors. An example of distance calculation is the Hamming distance method.

At block 320, the system selects an image with the least distance to the captured image. The selected image is identified as the reference image.

Figure 4:
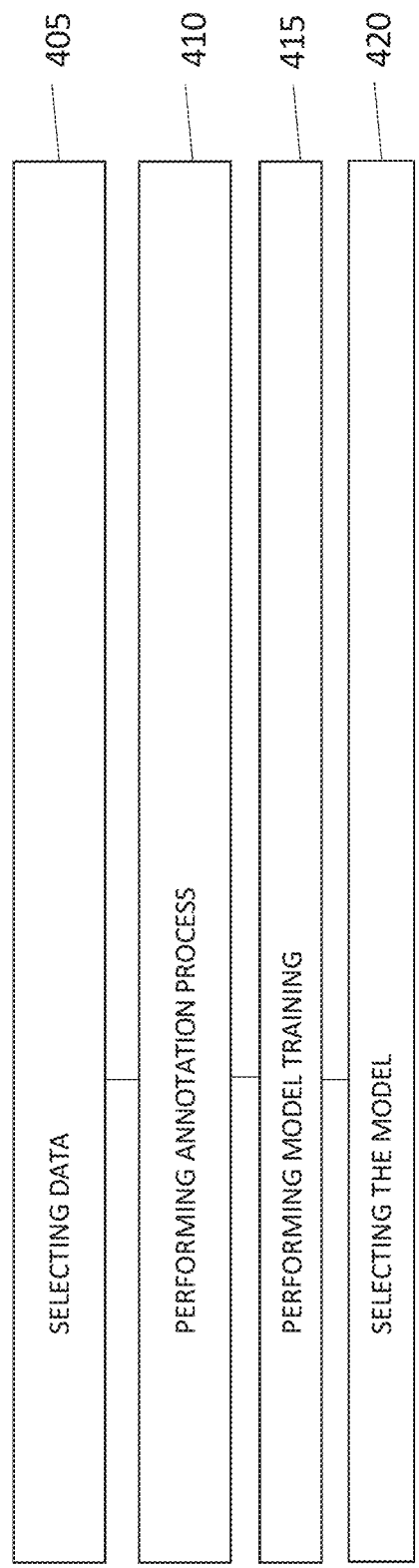
FIG. 4 is a flowchart diagram of training/re-training a model of the change detection process, according to some embodiment of the present invention.

FIG. 4 is a flowchart diagram of training/re-training a model, according to some embodiment of the present invention.

The process of detecting the change in the asset includes a preliminary step of training an Artificial Neural Network (ANN) for the computing of the asset-difference pixel map, using image sets, each image set include a pair of images and an asset-difference pixel map representing a difference between the images of the pair.

According to some embodiments, the change detection process is implemented using an artificial neural network model such as an attention Neural Network model based on Axial-Deeplab. The detection of the change is performed through forming the 2D (two-dimensional) self-attention by two 1-Dimensional self-attentions.

According to some embodiments, the system uses the Artificial Neural Network (ANN) that is trained for computing the asset-difference pixel map, which is the output of the model. According to some embodiments, the network is trained before performing the detection. The input of the training model includes the input images and the reference images. In some embodiments, the images are inputted via six channels. The trained input and reference images include semantic and non-semantic changes. The system annotated only the semantic changes as a change for training; thus, the network learns to ignore changes such as shadows, illumination variances, seasonal changes such as snow, rain, vegetation color etc. The system may also apply simulated (artificial) changes on input images to better train the network.

Referring now to the drawing:

Blocks 405 and 410 disclose the semi-self-supervised process.

At block 405, the data is selected in accordance with the data selection of the semi-self-supervised process. The system selects consistent data. Such consistent data may include pre planned missions that were executed multiple times, resulting in similar images of assets from different times, usually without natural occurring changes.

In some embodiments, the system selects out of the bulks of similar images, image pairs of input images and associate reference images. If a real change exists between the pair, the data is manually annotated in the asset-difference pixel map, otherwise, the data remains zero (black).

According to some embodiments the system splits the data into three non-dependent groups (train, validation and test), each consisting of a list of tuples. The tuples include input image, reference images and an asset-difference pixel map, which may be a grayscale image. The system selects the train group for training.

At block 410, the system performs data annotation and preparation. According to some embodiments, the reference image and the input image are divided to smaller patches (for example 256×256 pixels sized). In one embodiment, each patch includes three channels from the input image and three channels from the reference image. According to some embodiments, artificial changes are injected to some of the input patches ("stains") while the ground truth (GT) image is automatically updated with a change annotation. The injected "stains" may direct the final model to a certain type of changes. In some embodiments, the system generates augmentations from the patches. The augmentation may include Geometrical transformations applied to input image, reference image, ground truth (GT) and color transformations. The color transformations are applied to input image only and include Jittering, contrasts and the like.

At block 415 system performs the model training. In some embodiments, the training is semi-supervised. The object of the training is to teach the model what is not considered a change; that is to say: which changes to ignore. For that purpose, the system uses a custom loss function, which termed herein as focal non-semantic loss. The custom loss function allows to concentrate on areas in the patches outside the region of change (as annotated in the GT image):

$$loss=1-(\gamma \cdot TN+\epsilon)/(\gamma \cdot TN+\alpha \sim FN+\beta \cdot FP+\epsilon)$$

Where:

$$TN=sum((1-GT) \cdot (1-\hat{\gamma})) \text{ (true negative)}$$

$$PN=sum(GT \cdot (1-\hat{\gamma})) \text{ (false negative)}$$

$$PP=sum((1-GT) \cdot (1-\hat{\gamma})) \text{ (false positive)}$$

$\alpha=0.3$; $\beta=0.7$; $\gamma=0.05$ (hyper parameters)

According to some embodiments, the actual training process uses batch iterations (epochs) as follows:
i. Selecting batch of patch tuples (reference image and input image) with ground truth image (GT).
ii. inputting selected batch to Neural Network model with current weights to obtain predictions on training data.
iii. Calculating difference between prediction and ground truth using loss function.
iv. Updating model weights using back propagation method
v. Repeating process until stopping criteria is met (usually when learning metrics stabilizes)

When training a new model to a different use case (or re-training with new data) the system initializes the model with the current weights of the best model (transfer learning).

At block 420 the model is selected by repeating the training process with different hyper parameters which include loss function parameters and augmentation generation parameters and by validating prediction results on the validation set and selecting the model with best Mean Instruction Over Union (MIOU) metrics.

Figure 5:
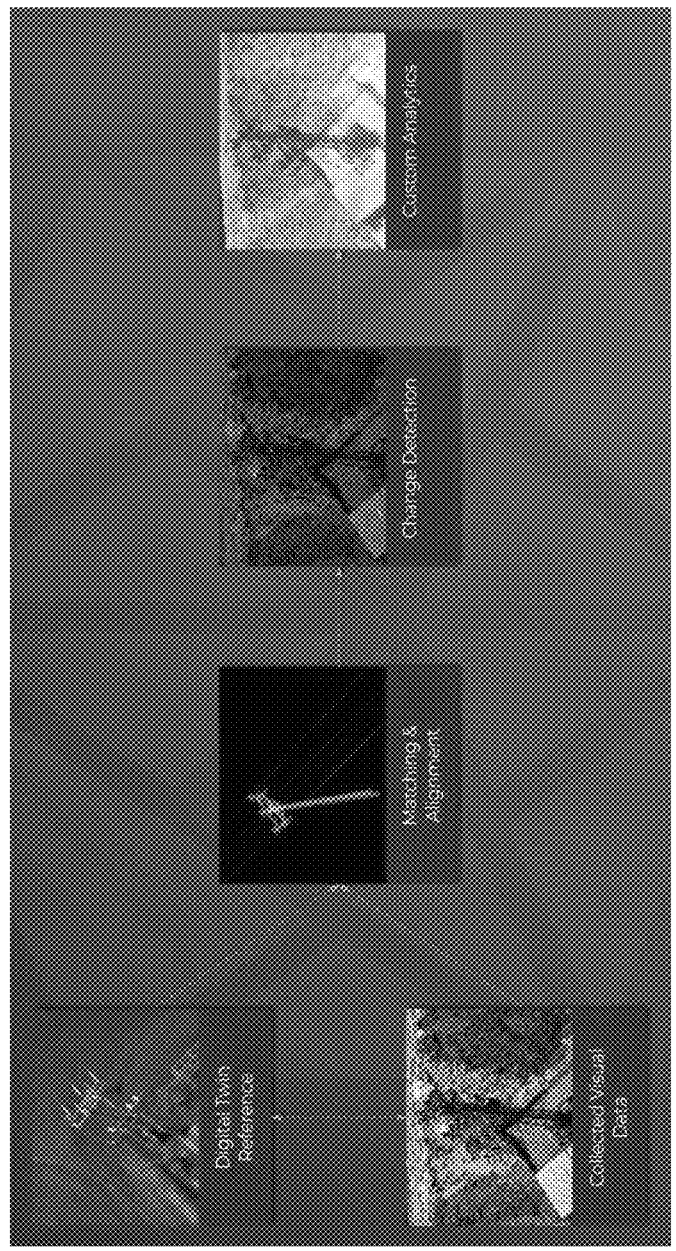
FIG. 5 is an example of a flow of detecting and classifying a change, according to some embodiment of the present invention.

FIG. 5 is an example of a flow of detecting and classifying a change according to some embodiment of the present invention. The figure discloses matching a reference image, alignment of a reference image, change detection custom analytics or classification process.

Figure 6:
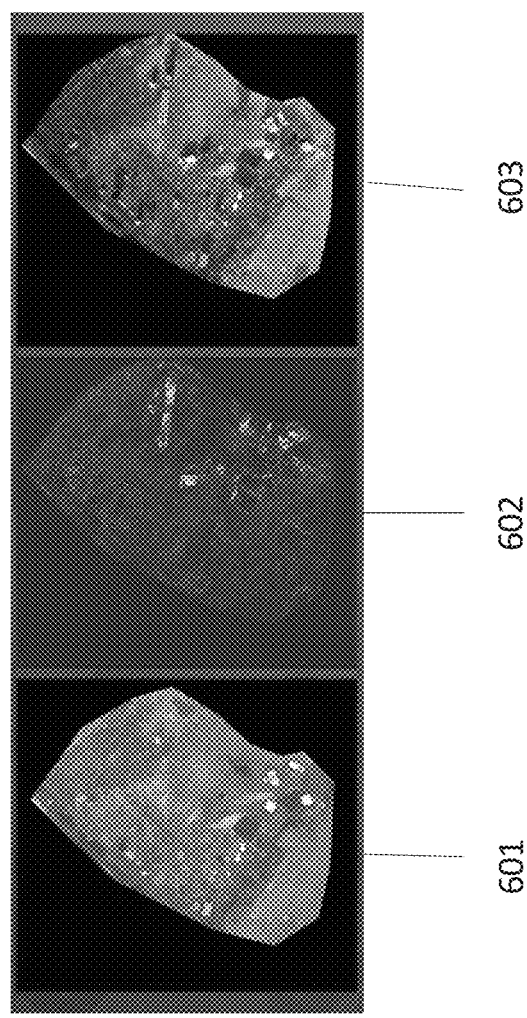
FIG. 6 is an example image of detecting a change on aerial site photography, according to some embodiment of the present invention.

FIG. 6 is an example image of detecting a change on aerial site photography process according to some embodiment of the present invention.

The figure discloses reference image 601, pair-difference asset-difference pixel map 602 (circle yellows show lights and shadows invariance) and input image 603.

Figure 7:
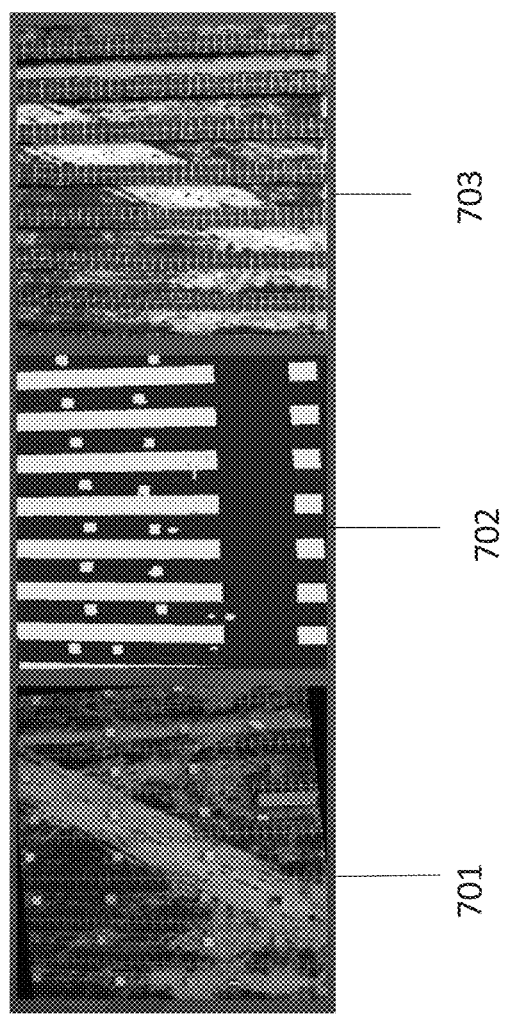
FIG. 7 is an example image of detecting a change during solar panel farm construction, according to some embodiment of the present invention.

FIG. 7 is an example image of detecting a change during solar panel farm construction according to some embodiments of the present invention. The figure discloses reference image 701 (during construction, aligned to input image), asset-difference pixel map 702, and input image after construction 703.

Figure 8:
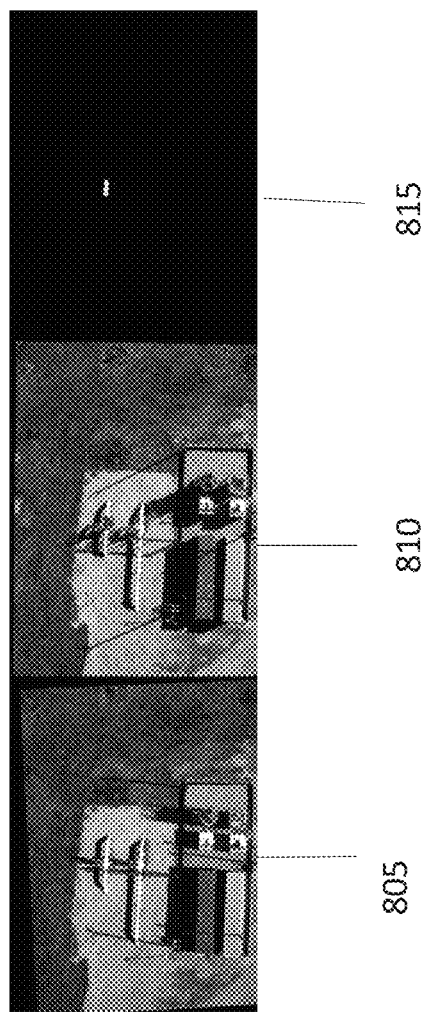
FIG. 8 is an example image of detecting leakage using change detection framework, according to some embodiment of the present invention.

FIG. 8 is an example image of detecting lleakage using change detection framework according to some embodiments of the present invention. The figure discloses the reference image showing the asset without leak aligned to the input image 805, input image in which the leak is visible 810 and asset-difference pixel map 815.

Figure 9:
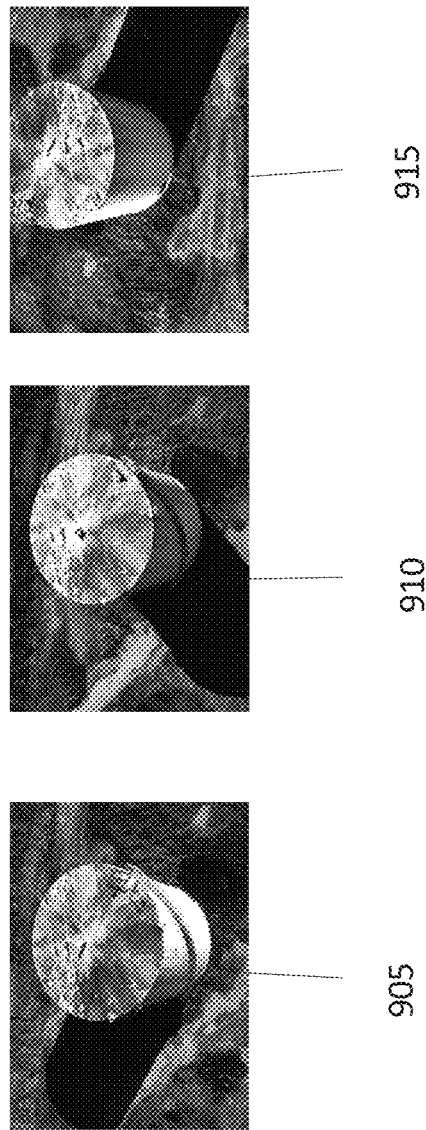
FIG. 9 is an example image of an asset dataset according to some embodiment of the present invention.

FIG. 9 is an example image of an asset dataset. Images 905 and 910 shows same view but in, different light conditions. Image 915 shows a different view according to some embodiments of the present invention.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of asset change detection using images, the method comprising steps executed by processing circuitry, the steps comprising:
    receiving at least one image of an asset for a task of detecting a change in the asset, the at least one image is captured by an image capturing device adapted for capturing images of the asset;
    receiving metadata relating to environmental conditions during capture of the received at least one image, the metadata is a member of a group consisting of: a light condition, a weather condition, a visibility condition, shadows, an indication of same time of day on a different day, and ambient temperature;
    deriving at least one criterion based on the at least one received attribute;
    selecting a reference image from a plurality of reference images of the asset which is most related to the received at least one image by selecting the reference image according to the at least one criterion based on the metadata of the selected reference image thus reducing differences between the selected reference image and the at least one received image which are caused by differences between the environmental conditions of the at least one received image and the selected reference image;
    computing an asset-difference pixel map indicating at least one semantic difference between the selected reference image and the at least one captured image; and
    detecting the change in the asset, using the computed asset-difference map;
    wherein said selecting of the reference image further comprises determining a viewpoint of the captured image and said at least one criterion is further based on the determined viewpoint.

2. The method of claim 1, further comprising classifying the change in the asset detected using the computed asset-difference pixel map.

3. The method of claim 1, further comprising communicating the detected change in the asset to a user.

4. The method of claim 1, further comprising aligning the captured image with respect to the selected reference image.

5. The method of claim 1, further comprising computing a three-dimensional (3D) model of the asset, using at least one of the reference images.

6. The method of claim 1, further comprising using an Artificial Neural Network (ANN) trained for said computing of the asset-difference pixel map.

7. The method of claim 1, further comprising a preliminary step of training an Artificial Neural Network (ANN) for said computing of the asset-difference pixel map, using a plurality of image sets, each image set comprising a pair of images and a pair-difference pixel map representing a difference between the images of the pair.

8. The method of claim 1, further comprising a preliminary step of training an Artificial Neural Network (ANN) for said computing of the asset-difference pixel map, using a plurality of image sets, each image set comprising a pair of images and a pair-difference pixel map representing a difference between the images of the pair, the method further comprising allowing a user to set pixel values for the pair-difference pixel map, for indicating a semantic difference between the images of the pair.

9. The method of claim 1, further comprising at least one of said metadata indicates a type of the task of detecting the change in the asset.

10. The method of claim 1, further comprising at least one of said metadata indicates time of the captured image used for the task.

11. The method of claim 1, further comprising at least one of said metadata indicates a capturing altitude of the captured image used for the task.

12. The method of claim 1, further comprising at least one of said metadata indicates a capturing attitude of the captured image used for the task.

13. The method of claim 1, wherein at least one of said metadata indicates at least one of: a resolution of the captured image, a field of view of the captured image, a zoom, and an exposure.

14. The method of claim 1, wherein at least one of said metadata indicates a characteristic of the asset.

15. A system for asset change detection using a drone, the system comprising:
    a processing circuitry; and
    a memory in communication with said processing circuitry, the memory containing instructions that, when executed by the processing circuitry, cause the processing circuitry to:
    receive at least one image of an asset for a task of detecting a change in the asset, the at least one image is captured by an image capturing device adapted for capturing images of the asset;
    receive metadata relating to environmental conditions during capture of the received at least one image, the metadata is a member of a group consisting of: a light condition, a weather condition, a visibility condition, shadows, an indication of a same time of day on a different, and ambient temperature;
    deriving at least one criterion based on the at least one received attribute;
    select a reference image from a plurality of reference images of the asset which is most related to the received at least one image by selecting the reference image according to the at least one criterion based on metadata of the selected reference image thus reducing differences between the selected reference image and the at least one received image which are caused by differences between the environmental conditions of the at least one received image and the selected reference image;
    compute an asset-difference pixel map indicating at least one semantic difference between the selected reference image and the at least one captured image; and
    detect the change in the asset, using the computed asset-difference map;
    wherein said selecting of the reference image further comprises determining a viewpoint of the captured image and said at least one criterion is further based on the determined viewpoint.

16. A non-transitory computer readable medium having stored thereon instructions for causing a processing circuitry to perform a process of asset change detection using a drone, the process comprising:
    receiving at least one image of an asset for a task of detecting a change in the asset, the at least one image is captured by an image capturing device adapted for capturing images of the asset;

receiving metadata relating to environmental conditions during capture of the received at least one image, the metadata is a member of a group consisting of: a light condition, a weather condition, a visibility condition, shadows, a an indication of a same time of day on a different, and ambient temperature;

deriving at least one criterion based on the at least one received attribute;

selecting a reference image from a plurality of reference images of the asset which is most related to the received at least one image by selecting the reference image according to the at least one criterion based on metadata of the selected reference image thus reducing differences between the selected reference image and the at least one received image which are caused by differences between the environmental conditions of the at least one received image and the selected reference image;

computing an asset-difference pixel map indicating at least one semantic difference between the selected reference image and the at least one captured image; and detecting the change in the asset, using the computed asset-difference map;

wherein said selecting of the reference image further comprises determining a viewpoint of the captured image and said at least one criterion is further based on the determined viewpoint.

17. The method of claim 1, wherein the metadata of the selected reference image is metadata associated with each of the plurality of reference images.

* * * * *